United States Patent [19]

Turner

[11] Patent Number: 4,588,851

[45] Date of Patent: May 13, 1986

[54] THERMOSTAT COVER

[75] Inventor: Donald R. Turner, Shelbyville, Ind.

[73] Assignee: Williams Industries, Inc., Shelbyville, Ind.

[21] Appl. No.: 737,717

[22] Filed: May 28, 1985

Related U.S. Application Data

[63] Continuation-in-part of Ser. No. 579,014, Feb. 10, 1984, Pat. No. 4,543,445.

[51] Int. Cl.4 .................. H02B 1/14; H01R 13/44; H05K 5/03
[52] U.S. Cl. .................. 174/5 R; 174/138 F; 219/330; 361/334
[58] Field of Search ............ 174/5 R, 66, 138 F; 200/304; 219/327, 328, 330; 334/85; 339/36, 198 J; 361/334

[56]       References Cited
U.S. PATENT DOCUMENTS 3,621,197  11/1971  Place ................. 174/5 R X
3,914,660  10/1975  Stearley ............. 174/5 R X
3,914,661  10/1975  Manecke et al. ...... 174/5 R X
4,543,445   9/1985  Turner .............. 174/5 R Primary Examiner—Laramie E. Askin
Attorney, Agent, or Firm—Barnes & Thornburg

[57]           ABSTRACT

A quick assembly shield for electrically insulating the front surface of an electrical control device includes a flexible generally rectangular body having a top retainer including a step for engaging the lip of a lug on the top surface of the control device. A pair of laterally interfering surfaces are provided for longitudinally aligning the shield with respect to the underlining control device. A spaced pair of inwardly facing catches engage in snap fashion a laterally spaced pair of lugs on the lower surface of the control device. The shield can be quickly and positively engaged with the underlying control device yet still provide access to permit variance in temperature or other control functions as required.

19 Claims, 6 Drawing Figures

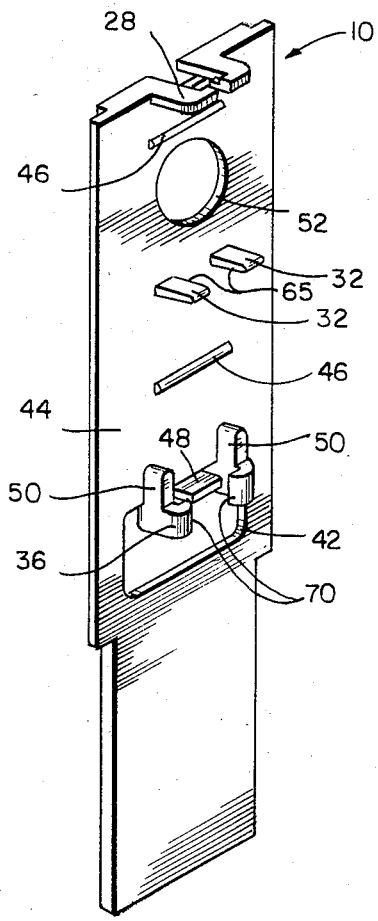
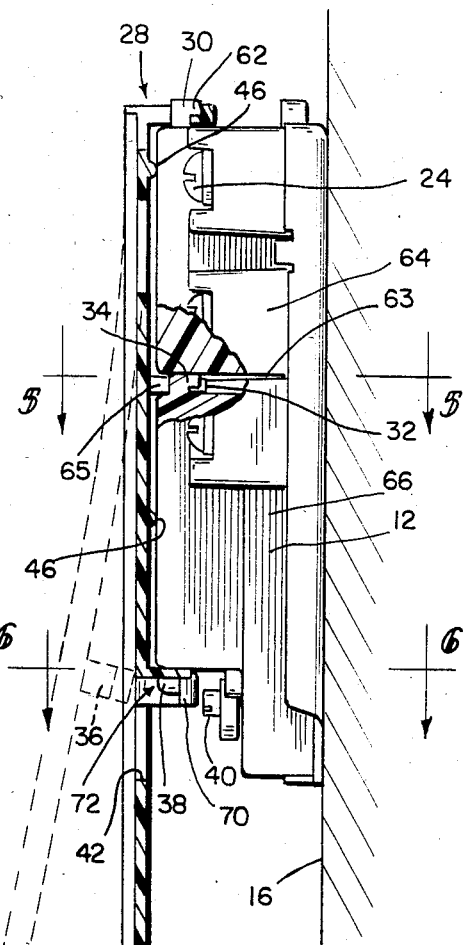
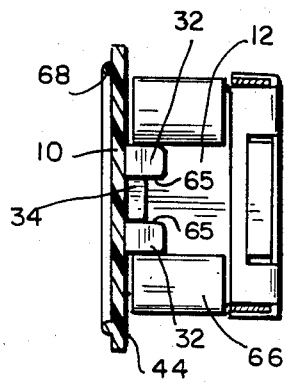
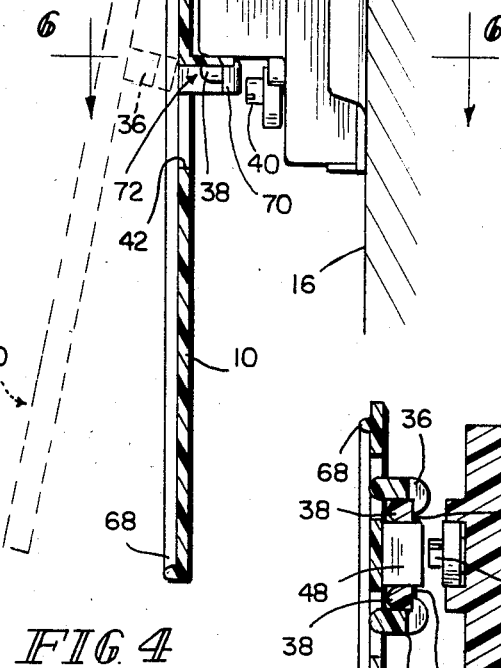
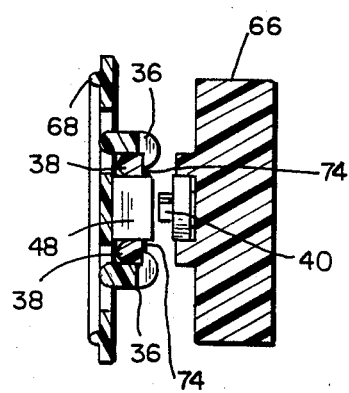
FIG. 2
FIG. 5
FIG. 4
FIG. 6

THERMOSTAT COVER

This application is a continuation-in-part of copending parent application Ser. No. 579,014 filed Feb. 10, 1984 now U.S. Pat. No. 4,543,445. This invention relates to insulated covers and more particularly to an insulated cover for electrical control devices which are used to control electrically operated water heaters.

An electrically operated apparatus such as a water heater includes an electrical circuit to supply electricity to the apparatus. The circuit generally includes resistive elements, wires, and electrical control devices such as circuit breakers, thermostats, and switches. These electrical control devices usually include one or more terminals which are used for attaching wires to the remaining portions of the circuit. Typically, water heaters require a large amount of electricity and thus the voltage present on the terminals connected to the circuit can be quite high. This presents a danger to persons working in the vicinity of the exposed parts of the circuit, such as the terminals on the control devices.

It is known to place electrically insulating shields over the terminals and other exposed portions of the circuit to reduce the chance of direct contact. Such shields are shown in my prior application referred to above as well as in U.S. Pat. Nos. 4,008,419 and 4,055,724. Preferably, these shields are electrically insulative, inexpensive to manufacture, and are held securely to the electrical device. It is particularly important that these shields be adapted to assemble quickly to the control devices during the original manufacture operation of the water heater. While quickness of the assembly is important, it is also important that the shield be secured in place with no possibility of a "false lock" or "false assembly" occurring.

In accordance with the present invention, a quick assembly shield is provided which includes a substantially planar body for covering the front surface of the control device including the electrical terminals. The body includes an aperture for alignment with the temperature adjusting means on the control device. A top retaining means on a top edge of the body projects toward the back surface of the device and includes an opening defined in part by a first engaging surface which engages a back facing surface on a first lug which is on the top surface of the electrical control device. A pair of spaced inwardly facing catches are situated within the aperture aligned with the temperature adjusting means. The pair of spaced inwardly facing catches project toward the back surface of the control device and engage a laterally spaced pair of lugs which are situated on either side of the temperature adjusting means. The catches include inclined back facing surfaces which, during assembly, contact the front outer surfaces of the laterally spaced pair of lugs and deflect the catches so as to assure quick assembly of the shield to the control device. As the assembly of the shield to the control device occurs, the deflection of the catches releases to achieve a "snap" action which is recognizable by the assembler as signalling a completed assembly of the shield to the control device.

One feature of the instant invention is that the shield is provided with a four-point connection to the electrical control device. The first connection is the gripping member or top retaining means on the top edge of the shield. The second and third connections comprise the pair of spaced inwardly facing catches which are disposed adjacent the upper edge of the aperture aligned with the temperature adjusting means and which grip the two laterally spaced pair of lugs. The fourth connection is made by a tab means extending into a laterally interfering contact with the device to align the shield on the front surface of the device medially between the sides of the device. This four-point connection has the advantage of providing a more secure and stable connection between the shield and the control device. The four-point connection aids in the speed of assembly by assuring alignment of the device. The snap action of the laterally spaced pair of lugs provides for a more stable connection which is less likely to wobble on the control device thus offering greater protection to one working in the vicinity of the circuit.

The four-point connection arrangement of the instant invention also makes the shield tamper resistant yet permits the shield to be easily installed and removed. The snap action of the inwardly facing catches engaging the laterally spaced pair of lugs on the control device provides more resistance to accidental removal by young children and the like, yet still provides all the required access to the actuable controls on the control device needed during assembly and later adjustment or repair.

Additional features and advantages of the invention will become apparent to those skilled in the art upon consideration of the following detailed description of a preferred embodiment exemplifying the best mode of carrying out the invention as presently perceived. The detailed description particularly refers to the accompanying figures.

FIG. 2 is a perspective view showing the back surface of the shield shown in FIG. 1.

FIG. 4 is a vertical sectional view of the shield shown in FIG. 1 assembled to an electrical control device which is partially broken away.

FIG. 5 is a sectional view taken along lines 5—5 of FIG. 4.

FIG. 6 is a sectional view taken along lines 6—6 of FIG. 4.

Figure 1:
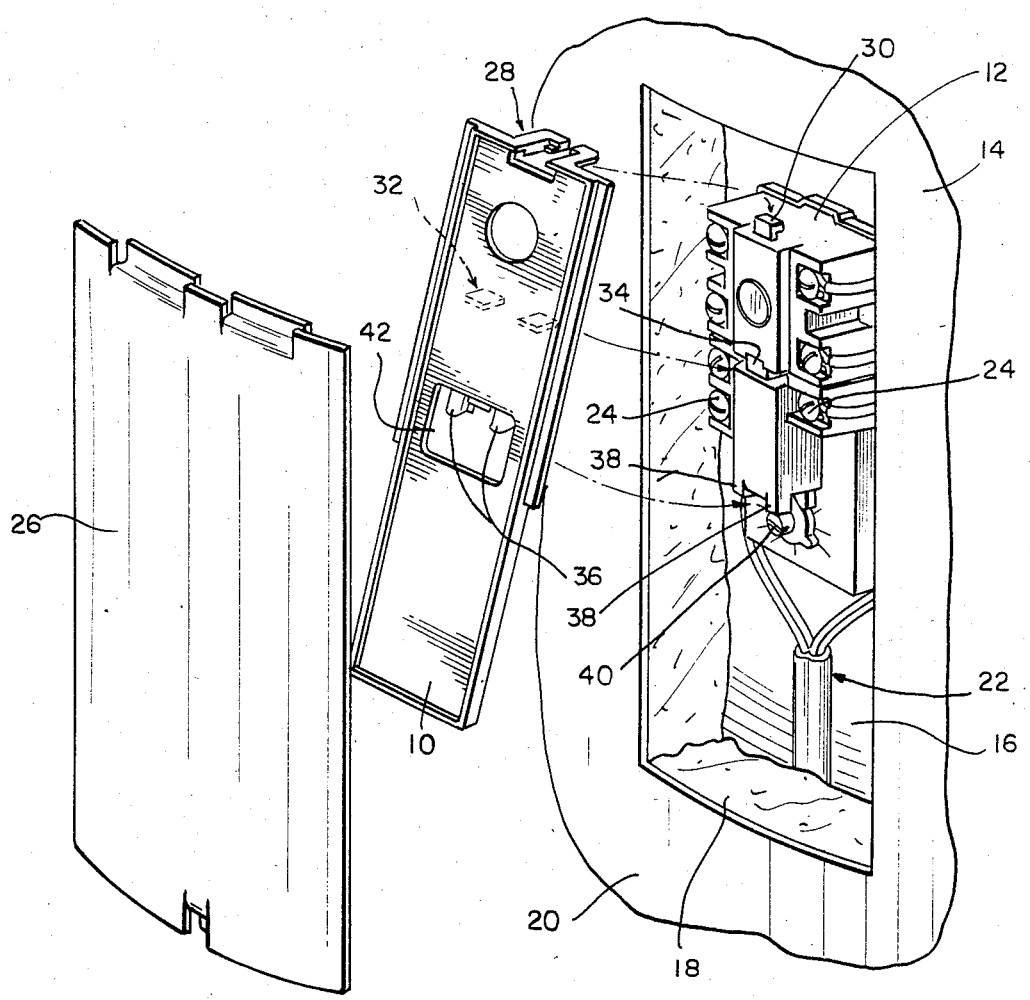
FIG. 1 is a perspective, exploded view of a shield of the present invention as it is assembled to a conventional water heater.

A quick assembly Protective shield 10 in accordance with the present invention is shown in FIG. 1 separated from but in the act of assembly to an electrical control device 12 situated on a water heater 14. The water heater is shown to comprise a tank 16 in which the water is heated and stored. The tank 16 is surrounded by a layer of insulation 18 which is in turn encompassed by a covering layer 20 generally made of metal. Wires 22 from the water heater and power source are connected to terminals 24 of the front surface of the control device 12. The control device 12 has its back surface secured to the tank 16 in a conventional manner so as to permit the control 12 to be responsive to the temperature of the water within the tank 16. A metallic cover 26 is provided for closing the illustrated opening after the electrically insulative shield 10 is assembled over the front surface of the control device 12.

The shield 10 achieves a four-point contact engagement with the control device 12. A first connection is provided by a top retaining means 28 which engages a back facing surface of lug 30 on the top surface of the control device 12. A tab means 32 extends into laterally interfering contact with a bridging lug 34. The third and fourth points of contact are provided by a pair of spaced inwardly facing substantially J-shaped catches 36 which engage a laterally spaced pair of lugs 38. The lugs 38 are situated above and on either side of a temperature adjusting means 40 on the control 12. The inwardly facing catches 36 are situated within a window 42 aligned with the temperature adjusting means 40.

As shown in FIG. 2, the shield 10 is generally rectangular and substantially planar. The shield 10 must be made of an electrically insulative material which is flexible yet has sufficient memory to return to the generally planar configuration illustrated. A satisfactory shield of the present invention may be made from polyethylene as well as many other plastics. The shield can be formed in the configuration illustrated by means of injection molding, and the parameters for forming a shield in accordance with the present invention would be apparent to a plastics engineer of ordinary skill when possessed with the present specification.

Projecting beyond the generally planar back surface 44 of the protective shield 10 are the top retaining means 28, the tab means 32, the catches 36, one or more spacer bars 46, and a tab or tongue 48. The catches 36 are supported in their position by means of integral flanges 50 also projecting from the back surface 44 of the shield 10. As well as aperture or window 42 which is intended for alignment with the temperature adjusting means, there is also an additional aperture opening 52 intended to be aligned with a push button control or the like on the control device.

Figure 3:
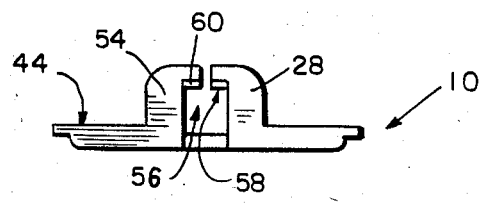
FIG. 3 is a top plan view of the shield shown in FIG. 1.

The top retaining means 28 is shown in greater detail in FIG. 3 to comprise a bifurcated member 54 having an opening 56 which is defined in part by a forwardly facing surface 58. The surface 58 includes a step 60 which engages under a lip 62 on lug 30 as shown in FIG. 4.

FIG. 4 further illustrates the intimate contiguous contact between the tank wall 16 and the back surface of the control device 12 which permits the thermal responsive character of the control device. FIG. 4 also illustrates the function of the spacing bars 46 which act to space the shield 10 slightly above the front surface of the control device 12.

FIG. 4 also illustrates the preferred manner in which a shield in accordance with the present invention is assembled onto the control device. The top retaining means 28 is first engaged with the top lug 30 in such a manner that the step 60 is placed under lip 62. The shield 10 is then displaced toward the control 12 while at the same time being flexed slightly so as to achieve the concave configuration shown in phantom. The tab means 32 are then inserted into the space 63 which exists between the upper body portion 64 and the lower body portion 66. The bridging lug 34 bridges space 63 between body portions 64 and 66. The tab means 32 is shown in detail in FIG. 5 to straddle the bridging lug 34. The straddling provides a lateral interference between the inner edges 65 of the tab means 32 and the outer edge of the bridging lug 34 so as to vertically align the shield 10 with respect to the control device 12.

As the shield is encouraged toward its planar configuration through the action of the peripheral flange 68 on the front surface as well as an applied pressure, the back surface 70 of catches 36 come in contact with the front surface 72 of the laterally spaced pair of lugs 38. An increasing pressure on the front surface of the shield 10 causes the catches 36 to deflect outwardly and, upon full engagement with the lugs 38, to snap into the position shown in FIG. 6 so as to engage the rearward facing surfaces 74 of the lugs 38. The tongue 48 projects between the lugs 38 to further assure a strong supporting engagement between the shield 10 and control device 12.

While the assembly and interaction between the various portions has been described in detail, in practice the assembly can be achieved in a very short amount of time of about one or two seconds. This quick assembly is achievable as a direct result of the secure primary engagement between the step in the top engaging means 28 and the top lug 30, the self aligning with the tab means 32, as well as the snap action of the spaced inwardly facing catches 36.

Although the invention has been described in detail with reference to the illustrated preferred embodiment, variations and modifications exist within the scope and spirit of the invention as described and as defined in the following claims.

What is claimed is:

1. A quick assembly protective shield for a front surface of an electrical control device, the device being responsive to the temperature of an apparatus secured to a back surface of the device, the device including on the front surface electrical terminals for receiving wires from the apparatus and a temperature adjusting means for adjusting the temperature at which the device operates to control the apparatus, the device further including a first lug on a top surface and a laterally spaced pair of lugs on a lower surface adjacent the temperature adjusting means, the lugs each including a back facing surface, the device comprising two body portions separated at least in part by a space and a bridging lug adjacent the front surface bridging the space, the protective shield comprising a substantially planar body for covering the front surface of the device including the electrical terminals, the body being temporarily deformable to a nonplanar configuration during assembly to the electrical control device, the body having an aperture for alignment with the temperature adjusting means, a top retaining means on a top edge of the body for projecting toward the back surface of the device having an opening defined in part by a first engaging surface for engaging the back facing surface of the first lug, a pair of integral tabs projecting from the back surface of the body for straddling the bridging lug to align the shield on the front surface of the device, and a pair of spaced inwardly facing catches situated within the aperture and for projecting toward the back surface of the device for engaging the laterally spaced pair of lugs, the catches including inclined back facing surfaces for contacting front outer surfaces of the laterally spaced pair of lugs during assembly to deflect the catches so as to assure quick assembly of the shield to the electrical control device.

2. A quick assembly protective shield for a front surface of an electrical control device, the device being responsive to the temperature of an apparatus secured to a back surface of the device, the device including on the front surface electrical terminals for receiving wires from the apparatus and a temperature adjusting means for adjusting the temperature at which the device operates to control the apparatus, the device including a first lug on a top surface and a laterally spaced pair of lugs on a lower surface adjacent the temperature adjusting means, the lugs each including a back facing surface, the protective shield comprising a substantially planar body for covering the front surface of the device including the electrical terminals, the body having an aperture for alignment with the temperature adjusting means, a top retaining means on a top edge of the body for projecting toward the back surface of the device having an opening defined in part by a first engaging surface for engaging the back facing surface of the first lug, the first engaging surface including a step defined by first and second front facing surfaces separated by a top facing surface, and a pair of spaced inwardly facing catches situated within the aperture and for projecting toward surface of the device for engaging the laterally spaced pair of lugs, the catches including inclined back facing surfaces for contacting front outer surfaces of the laterally spaced pair of lugs during assembly to deflect the catches so as to assure quick assembly of the shield to the electrical control device.

3. The quick assembly protective shield of claim 2 further comprising a tongue projecting from the top edge of the aperture dimensioned to fit between the laterally spaced pair of lugs.

4. The quick assembly protective shield of claim 2 wherein the catches are substantially J-shaped, each including a rounded back facing surface.

5. The quick assembly protective shield of claim 2 wherein the catches include integral flanges projecting from the back surface of the substantially planar body.

6. The quick assembly protective shield of claim 2 further comprising a laterally extending spacer bar provided on the back surface of the substantially planar body.

7. The quick assembly protective shield of claim 2 further comprising a flange projecting from the front surface along the perimeter of the substantially planar body.

8. The quick assembly protective shield of claim 2 further comprising a tab projecting from the back facing surface of the substantially planar body about midway between the top retaining means and the pair of spaced catches.

9. A quick assembly protective shield for a front surface of an electrical control device, the device being responsive to the temperature of an apparatus secured to a back surface of the device, the device including on the front surface electrical terminals for receiving wires from the apparatus and a temperature adjusting means for adjusting the temperature at which the device operates to control the apparatus, the device further including a first lug on a top surface and a laterally spaced pair of lugs on a lower surface adjacent the temperature adjusting means, the lugs each including a back facing surface, the protective shield comprising a substantially planar body for covering the front surface of the device including the electrical terminals, the body having an aperture for alignment with the temperature adjusting means, a top retaining means on a top edge of the body for projecting toward the back surface of the device having an opening defined in part by a first engaging surface for engaging the back facing surface of the first lug, a tongue projecting from the top edge of the apertute dimensioned to fit between the laterally spaced pair of lugs, and a pair of spaced inwardly facing catches situated within the aperture and for projecting toward the back surface of the device for engaging the laterally spaced pair of lugs, the catches including inclined back facing surfaces for contacting front outer surfaces of the laterally spaced pair of lugs during assembly to deflect the catches so as to assure quick assembly of the shield to the electrical control device.

10. The quick assembly protective shield of claim 9, wherein the catches are substantially J-shaped, each including a rounded back facing surface.

11. The quick assembly protective shield of claim 9, wherein the catches include integral flanges projecting from the back surface of the substantially planar body.

12. The quick assembly protective shield of claim 9, further comprising a laterally extending spacer bar provided on the back surface of the substantially planar body.

13. The quick assembly protective shield of claim 9, further comprising a flange projecting from the front surface along the perimeter of the substantially planar body.

14. The quick assembly protective shield of claim 9, further comprising a tab projecting from the back facing surface of the substantially planar body about midway between the top retaining means and the pair of spaced catches.

15. A quick assembly protective shield for a front surface of an electrical control device, the device being responsive to the temperature of an apparatus secured to a back surface of the device, the device including on the front surface electrical terminals for receiving wires from the apparatus and a temperature adjusting means for adjusting the temperature at which the device operates to control the apparatus, the device further including a first lug on a top surface and a laterally spaced pair of lugs on a lower surface adjacent the temperature adjusting means, the lugs each including a back facing surface, the protective shield comprising a substantially planar body for covering the front surface of the device including the electrical terminals, the body having an aperture for alignment with the temperature adjusting means, a top retaining means on a top edge of the body for projecting toward the back surface of the device having an opening defined in part by a first engaging surface for engaging the back facing surface of the first lug, and a pair of spaced inwardly facing catches situated within the aperture and for projecting toward the back surface of the device for engaging the laterally spaced pair of lugs, the catches including integral flanges projecting from the back surface of the substantially planar body and inclined back facing surfaces for contacting front outer surfaces of the laterally spaced pair of lugs during assembly to deflect the catches so as to assure quick assembly of the shield to the electrical control device.

16. The quick assembly protective shield of claim 15, wherein the catches are substantially J-shaped, each including a rounded back facing surface.

17. The quick assembly protective shield of claim 15, further comprising a laterally extending spacer bar provided on the back surface of the substantially planar body.

18. The quick assembly protective shield of calim 15, further comprising a flange projecting from the front surface along the perimeter of the substantially planar body.

19. The quick assembly protective shield of claim 15, further comprising a tab projecting from the back facing surface of the substantially planar body about midway between the top retaining means and the pair of spaced catches.

* * * * *

UNITED STATES PATENT AND TRADEMARK OFFICE
CERTIFICATE OF CORRECTION

PATENT NO. : 4,588,851
DATED : May 13, 1986
INVENTOR(S) : Donald R. Turner

It is certified that error appears in the above-identified patent and that said Letters Patent is hereby corrected as shown below:

In Col. 4, Line 64 insert after device --further--.

In Col. 5, Line 11 insert after toward --the back--.

In Col. 6, Line 58 replace "calim" with --claim--.

Signed and Sealed this

Fourteenth Day of October, 1986

[SEAL]

*Attest:*

DONALD J. QUIGG

*Attesting Officer*    *Commissioner of Patents and Trademarks*